United States Patent
Takeuchi et al.

(10) Patent No.: US 8,443,140 B2
(45) Date of Patent: May 14, 2013

(54) APPARATUS, COMPUTER-READABLE RECORDING MEDIUM AND STORAGE SYSTEM

(75) Inventors: Toshiaki Takeuchi, Kawasaki (JP); Masakazu Sakamoto, Kawasaki (JP); Tetsuya Kinoshita, Kawasaki (JP); Takuya Kurihara, Kawasaki (JP); Jun Takeuchi, Kawasaki (JP); Atsushi Shinohara, Kawasaki (JP); Yusuke Kurasawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 368 days.

(21) Appl. No.: 12/820,686

(22) Filed: Jun. 22, 2010

(65) Prior Publication Data

US 2010/0332772 A1 Dec. 30, 2010

(30) Foreign Application Priority Data

Jun. 25, 2009 (JP) ................................. 2009-151527

(51) Int. Cl.
*G06F 12/02* (2006.01)

(52) U.S. Cl.
USPC .......................................... 711/113; 711/151

(58) Field of Classification Search .................. None
See application file for complete search history.

(56) References Cited

U.S. PATENT DOCUMENTS

| 7,475,169 | B2 * | 1/2009 | Yuhara et al. ................... 710/38 |
|---|---|---|---|
| 2004/0123180 | A1 * | 6/2004 | Soejima et al. ................... 714/5 |
| 2005/0193168 | A1 * | 9/2005 | Eguchi et al. ................. 711/114 |
| 2006/0036648 | A1 | 2/2006 | Frey et al. |
| 2006/0090048 | A1 | 4/2006 | Okumoto et al. |
| 2008/0114932 | A1 * | 5/2008 | Kobayashi ..................... 711/114 |
| 2010/0325379 | A1 * | 12/2010 | Eguchi et al. ................. 711/165 |

FOREIGN PATENT DOCUMENTS

| JP | 10-198607 | 7/1998 |
|---|---|---|
| JP | 10-333838 | 12/1998 |
| JP | 2006-127028 | 5/2006 |
| JP | 2007-535763 | 12/2007 |
| JP | 2008-123444 | 5/2008 |
| WO | WO 2005/111811 | 11/2005 |

OTHER PUBLICATIONS

Japanese Patent Office Notification of Reasons for Refusal issued Mar. 1, 2011 for corresponding Japanese Patent Application No. 2009-151527.

* cited by examiner

*Primary Examiner* — Than Nguyen
(74) *Attorney, Agent, or Firm* — Staas & Halsey LLP

(57) ABSTRACT

A apparatus for controlling a first storage and a second storage, has a controller for receiving a write command and a read command sent out from a host and for sending out the write command and the read command to the first storage and the second storage, a determining unit for sending out a request corresponding to the write command to the first storage and the second storage, for receiving a first response corresponding to the request from the first storage and a second response corresponding to the request from the second storage, and for determining one of the storages on the basis of each of response times, a first writing unit for writing data into the determined storage, and a second writing unit for writing the data written in the determined storage into the other storage after writing the data into the determined storage by the first writing unit.

16 Claims, 13 Drawing Sheets

APPARATUS, COMPUTER-READABLE RECORDING MEDIUM AND STORAGE SYSTEM

CROSS-REFERENCE TO RELATED APPLICATION

This application is based upon and claims the benefit of priority of the prior Japanese Patent Application No. 2009-151527, filed on Jun. 25, 2009, the entire contents of which are incorporated herein by reference.

FIELD

The present art relates to an apparatus, a computer-readable recording medium and a storage system.

BACKGROUND

Various types of systems, in which memory resources are virtualized and used, have been proposed so as to effectively utilize the memory resources in external virtual FC switches such as storages. For example, in the case in which a storage area network (SAN) which is a high-speed network used for connecting a host and a storage is established, there is a virtual FC switch which includes a function for inclusively virtualizing storage resources and causing the inclusively-virtualized storage resources to appear to be a new storage configuration, in addition to a function as a fibre channel (FC) switch which functions as a relay device.

The virtual FC switch has a function for configuring an arbitrary area of a connected physical storage device as a virtual disk and showing the virtual disk to the host through a virtual target (VT). In addition, the virtual FC switch has a function for copying data to another virtual disk configured in the same way.

[patent document 1] Japanese Laid-open Patent Publication No. 2006-127028

SUMMARY

According to an aspect of an embodiment, an apparatus for controlling a first storage for storing data and a second storage for storing data, has a controller for receiving a write command sent out from a host and for sending out the write command to the first storage and the second storage, a determining unit for sending out a request corresponding to the write command to the first storage and the second storage, for receiving a first response corresponding to the request from the first storage and a second response corresponding to the request from the second storage, and for determining one of the storages on the basis of a first and second response times, the first response time and the second response time being time until receiving the response from the first and second storage after sending out the request to the first and second storage, a first writing unit for writing data into the determined storage, and a second writing unit for writing the data written in the determined storage into the other storage after writing the data into the determined storage by the first writing unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 8:
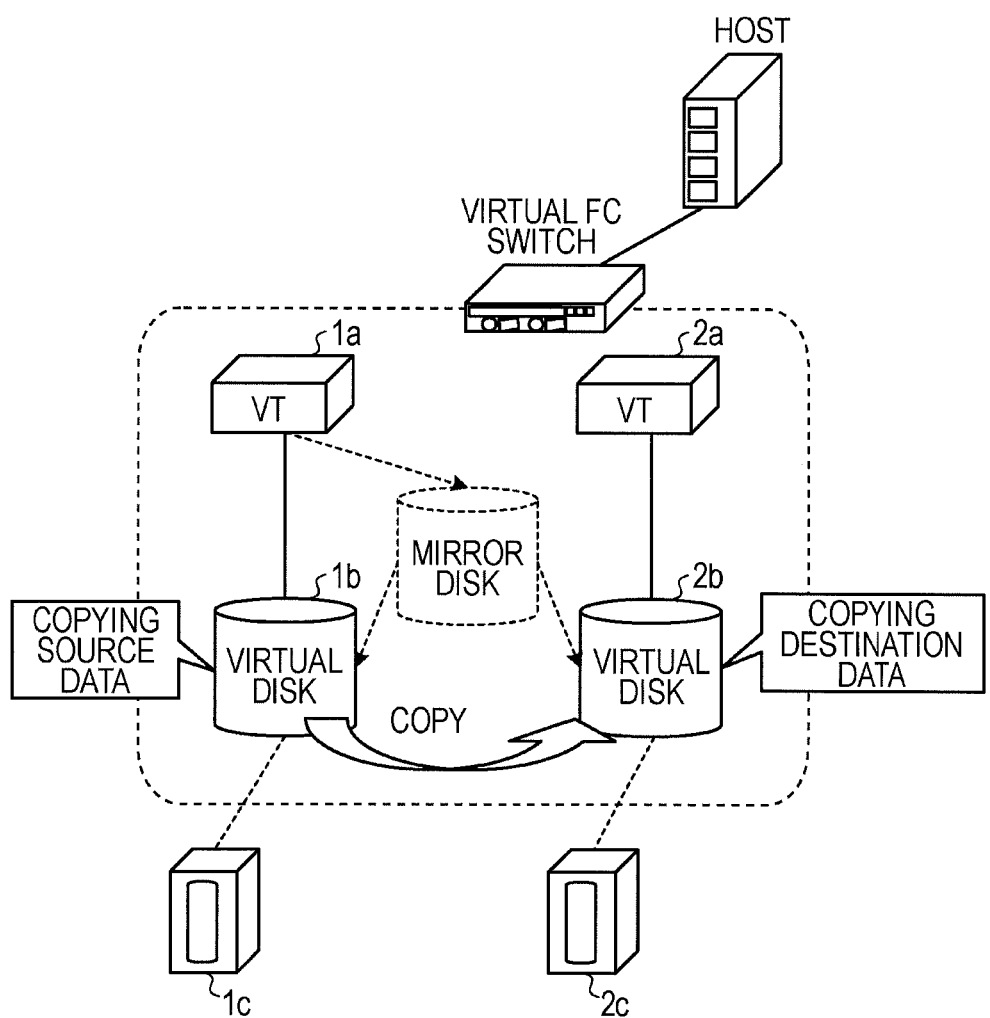
FIG. 8 is a diagram for illustrating the related art.

FIG. 8 is a diagram for illustrating the related art. As shown in FIG. 8, a virtual FC switch of the related art creates a virtual disk 1b from a storage 1c and connects the virtual disk 1b to a host through a virtual target VT 1a. In the same way, the virtual FC switch of the related art creates a virtual disk 2b from a storage 2c and connects the virtual disk 2b to the host through a virtual target VT 2a. When the virtual FC switch copies data from the virtual disk 1b to the virtual disk 2b, the virtual FC switch reads out data from the virtual disk 1b which is a copying source. Then, from the initial logical block address (LBA) of the virtual disk 1b to the final LBA thereof, the virtual FC switch repeatedly performs an operation to write data into the virtual disk 2b which is a copying destination.

In addition, even if the virtual FC switch receives "Write I/O" from the host during a copy operation, the virtual FC switch creates a mirror disk on the basis of both the copying source virtual disk and the copying destination virtual disk so as to maintain equivalence between data of the virtual disk 1b and the virtual disk 2b. Then, the virtual FC switch performs a synchronous write operation for writing "Write I/O", received from the host, to both virtual disks.

Figure 9:
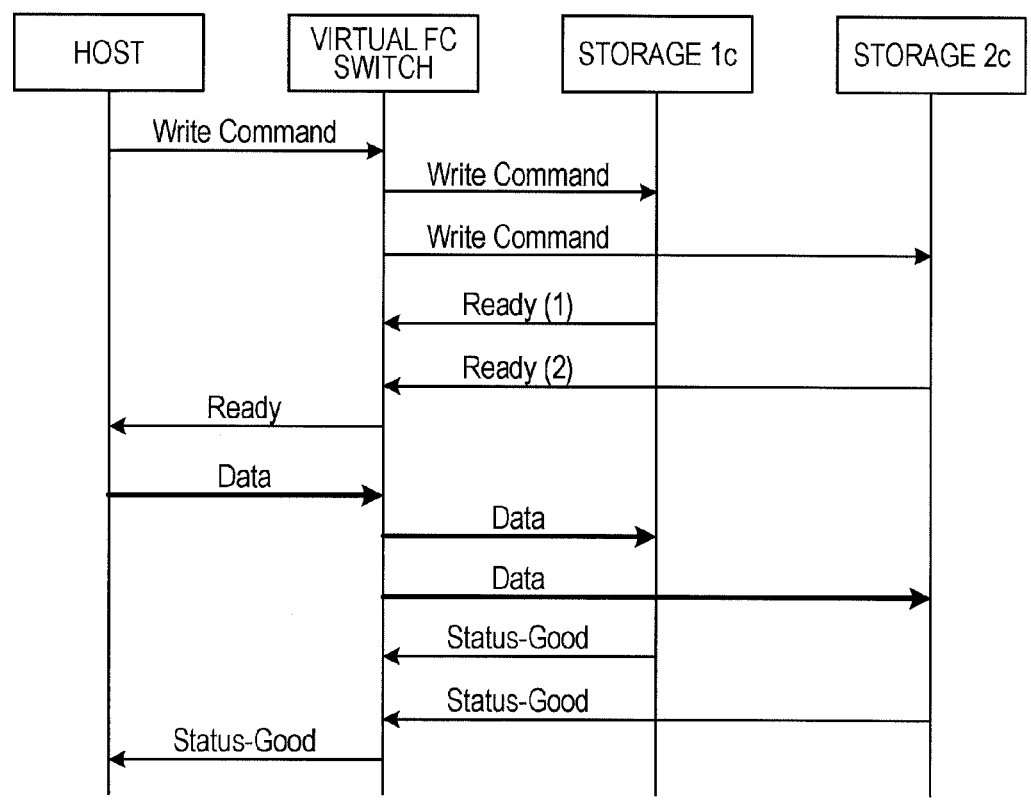
FIG. 9 is a diagram for illustrating the related art.

The synchronous write operation performed in the virtual FC switch will be described simply. As shown in FIG. 9, when the virtual FC switch receives "Write Command", the virtual FC switch transfers the write command to the storages 1c and 2c. When the virtual FC switch receives "Ready" responses (for example, Ready (1) and Ready (2)) to the write command from the storages 1c and 2c, the virtual FC switch transfers the "Ready" responses to the host. When the virtual FC switch receives data corresponding to the write command from the host, the virtual FC switch writes the data received from the host into the storages 1c and 2c. When the virtual FC switch receives statuses "Status-Good", which indicate write completion, from the storages 1c and 2c, the virtual FC switch transfers the "Status-Good" to the host and completes the synchronous write operation.

In addition, regarding "Read I/O" from the host, the virtual FC switch only reads out data from the virtual disk 1b which is a copying source, and transfers the data to the host.

Figure 10:
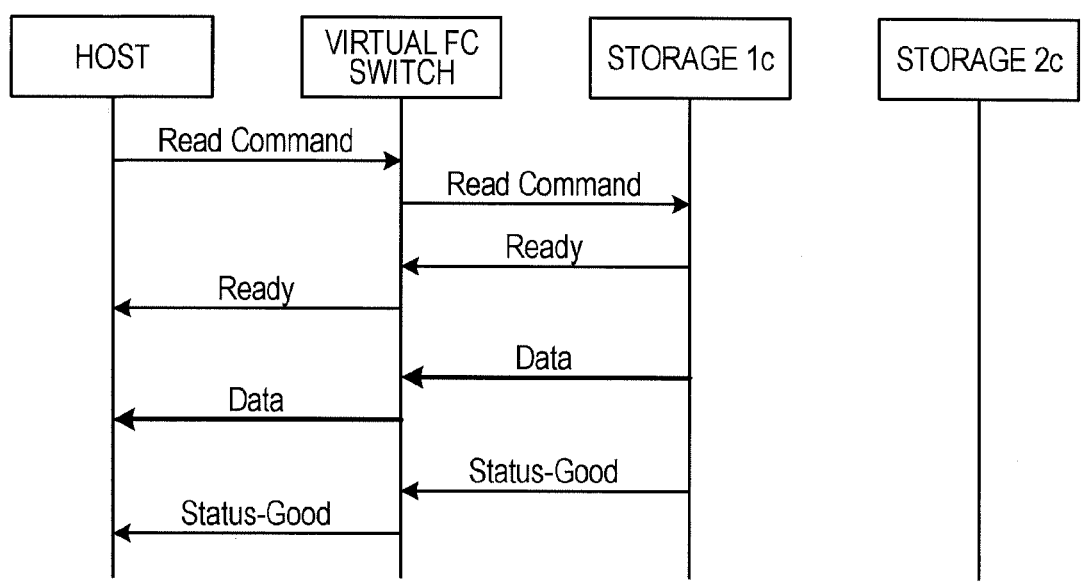
FIG. 10 is a diagram for illustrating the related art.

The read-out operation performed in the virtual FC switch will be described simply. As shown in FIG. 10, when the virtual FC switch receives "Read Command" (described hereinafter as read command), the virtual FC switch transfers the read command to the storage 1c. When the virtual FC switch receives a "Ready" response to the read command from the storage 1c, the virtual FC switch transfers the "Ready" response to the host. Subsequently, when the virtual FC switch receives data to be read (Data) from the storage 1c, the virtual FC switch transfers the data to the host. Then, when the virtual FC switch receives a status, "Status-Good", which indicates read completion, from the storage 1c, the virtual FC switch transfers the status, "Status-Good", which indicates read completion, to the host and completes the read operation.

A virtual FC switch of the related art causes the following problem in the synchronous write operation described with reference to FIG. 9. Namely, as shown in FIG. 11, when the performance of the storage 2c which configures a copying destination virtual disk is low, a response (Ready) to a write command, which is transferred from the virtual disk 2b to the virtual FC switch, is delayed.

Even though the virtual FC switch has already received a response from the storage 1c which is a copying source, the virtual FC switch obtains data to be written from the host, after a response to the write command arrives from the storage 2c. In this way, as a result, the I/O performance of the virtual FC switch is restrained by the storage 2c which has lower performance. Accordingly, the processing performance for I/O from the host (performance of a processing operation in which the write command and the read command from the host are processed) becomes worse.

Figure 11:
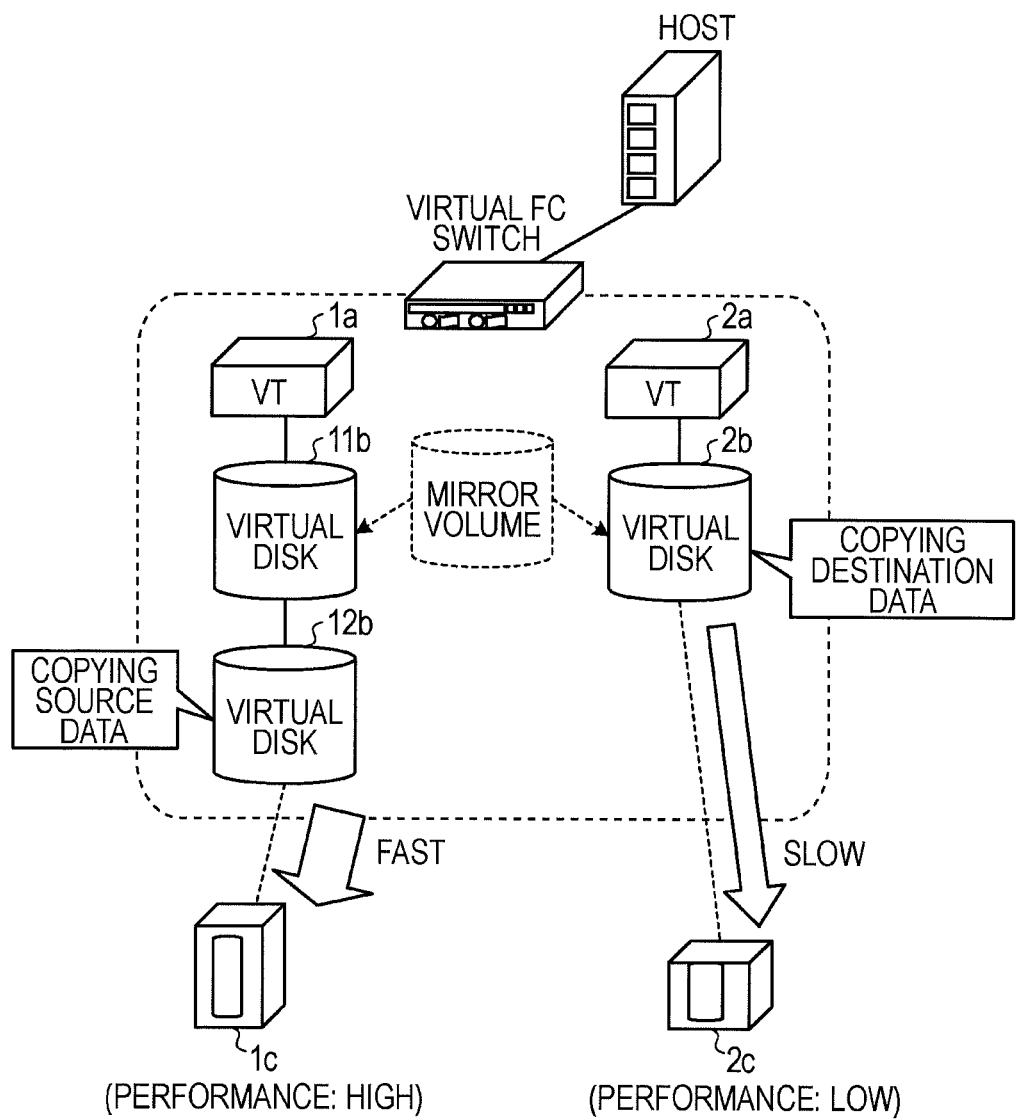
FIG. 11 is a diagram for illustrating the related art.
Figure 13:
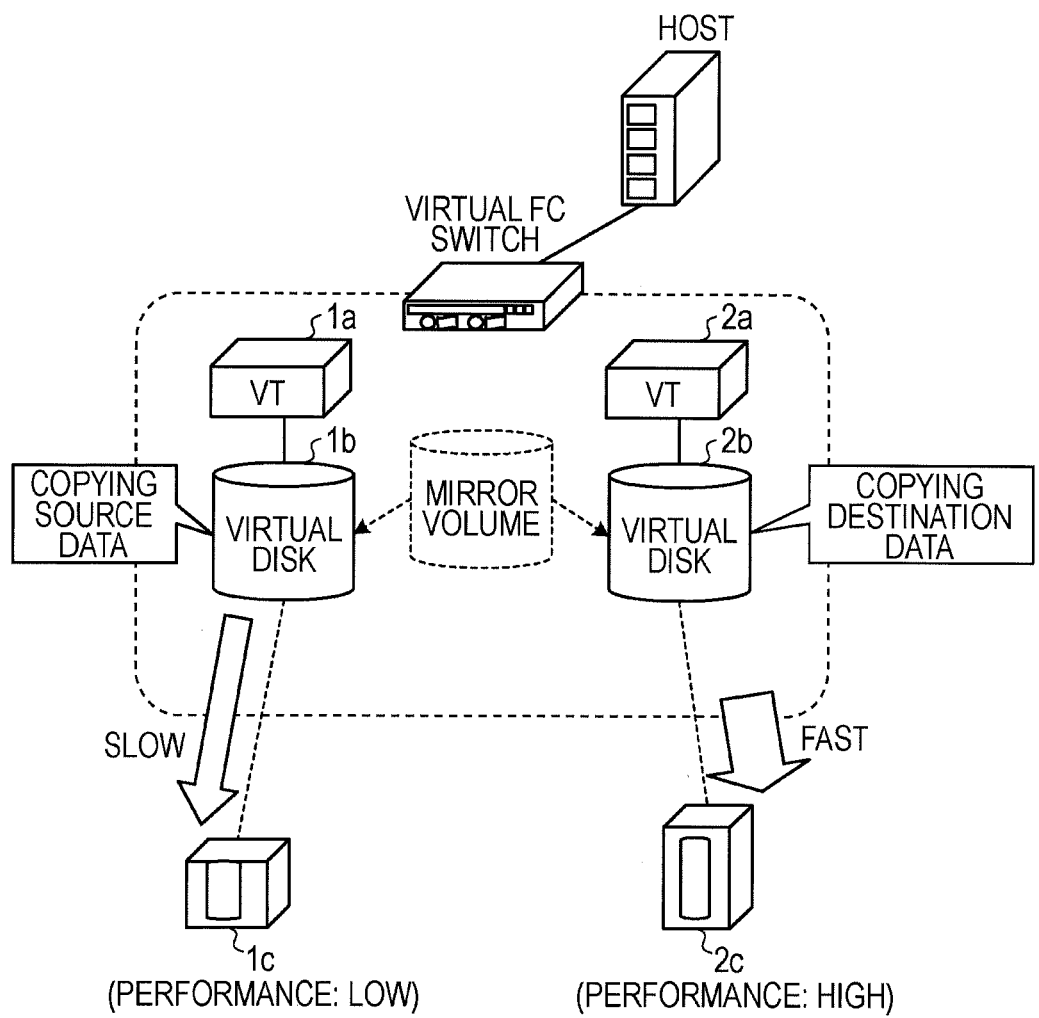
FIG. 13 is a diagram for illustrating the related art.

In addition, as shown in FIG. 13, when the performance of the storage 1c which configures a copying source virtual disk is low, contrary to the case shown in FIG. 11, the performance of the storage 2b which is a copying destination is restrained by the performance of the storage 1b which is a copying source and, as a result, the processing performance for I/O from the host becomes worse.

Figure 12:
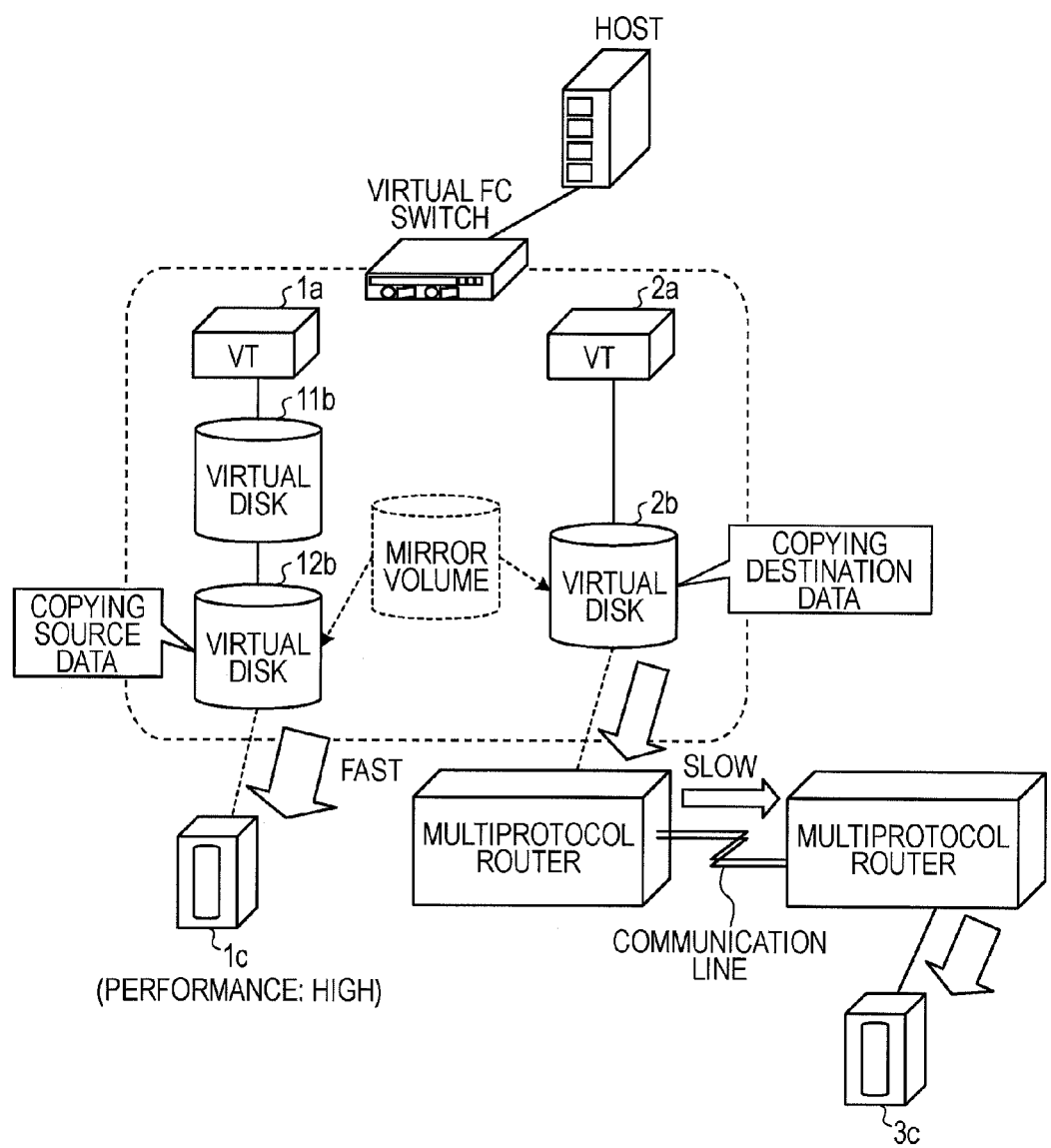
FIG. 12 is a diagram for illustrating the related art.

In addition, in the case in which, by using a multiprotocol router, a virtual disk is configured by a storage which is remotely situated through a communication line and a copy operation is performed, for example, as shown in FIG. 12, a delay in a response from a storage 3c which is a copying destination may occur. Accordingly, in the same ways as the cases shown in FIGS. 11 and 13, the processing performance for I/O from the host may become worse. In addition, FIGS. 11 to 13 are diagrams for illustrating problems of the related art.

Taking the above-mentioned circumstances into account, a technique disclosed in the specification is provided. Then, it is an object to provide a data relay device and a storage system which are capable of preventing the processing performance for I/O from the host from becoming worse in a storage system including a plurality of storages which have individually different data input-output performance.

Hereinafter, an embodiment according to a data relay device and a storage system disclosed in the present application will be described in detail with reference to figures. In addition, the technique disclosed in the present application is not limited to an example, described hereinafter, of the embodiment according to the data relay device and the storage system.

Embodiment 1

Figure 1:
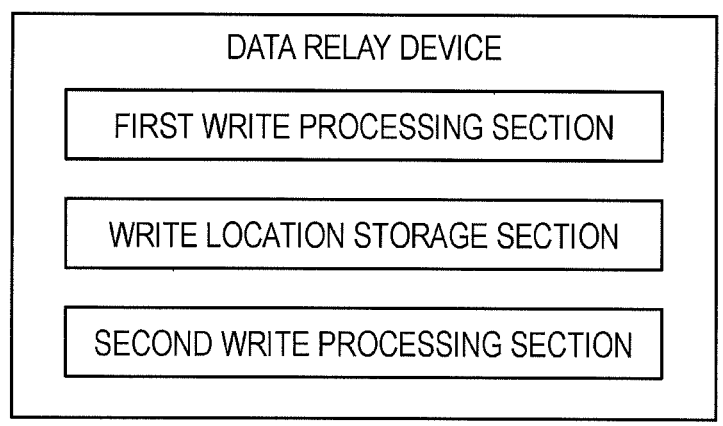
FIG. 1 is a diagram for illustrating a data relay device according to an embodiment 1.

FIG. 1 is a diagram for illustrating a data relay device according to an embodiment 1. As shown in FIG. 1, the data relay device according to the embodiment 1 includes a first write processing section, a write location storage section, and a second write processing section.

When a write command is transferred from a higher-level device during a copy session used for copying data from a first virtual storage section to a second virtual storage section, the first write processing section executes the write command only on one virtual storage section having higher input-output performance.

The write location storage section stores a write location of the virtual storage section on which the write command is executed by the first write processing section.

The second write processing section writes data stored in the virtual storage section into the other virtual storage section on which the write command has not been executed yet, after the write processing performed by the first write processing section is terminated, the data being fixed by the write location stored in the write location storage section.

In this way, the data relay device according to the embodiment 1 performs a data processing operation by using, at full value, the performance of the storage device having higher performance and prevents the processing performance for write I/O from a host from becoming worse.

Embodiment 2

A virtual FC switch which is an example of an embodiment of the data relay device disclosed in the present application will be described hereinafter.

Regarding the summary of operations performed by the data relay device according to an embodiment 2, when the data relay device receives write I/O (write command) from a host during a data copy operation performed between virtual disks configured with arbitrary areas of a plurality of connected physical storage devices, the data relay device performs, through a mirror disk, a synchronous write operation on individual virtual disks in synchronization with the write I/O from the host.

The main feature of the data relay device according to the embodiment 2 exists in the following description.

Namely, in the case in which the input-output performance of a first virtual storage section which is a copying source is higher than the input-output performance of a second virtual storage section which is a copying destination, a first write processing section, included in the virtual FC switch, executes a write command only on the first virtual storage section in parallel with the copy operation. A write location storage section, included in the virtual FC switch, stores a write location of the first virtual storage section on which the write command is executed by the first write processing section. After the write processing performed by the first write processing section is terminated, a second write processing section, included in the virtual FC switch, writes data stored in the first virtual storage section into the second virtual storage section, the data being fixed by the write location stored in the write location storage section, and thereby makes data in the virtual disks equivalent to each other. The virtual FC switch according to the embodiment 2 will be specifically described hereinafter.

Configuration of Virtual FC Switch (Embodiment 2)

Figure 2:
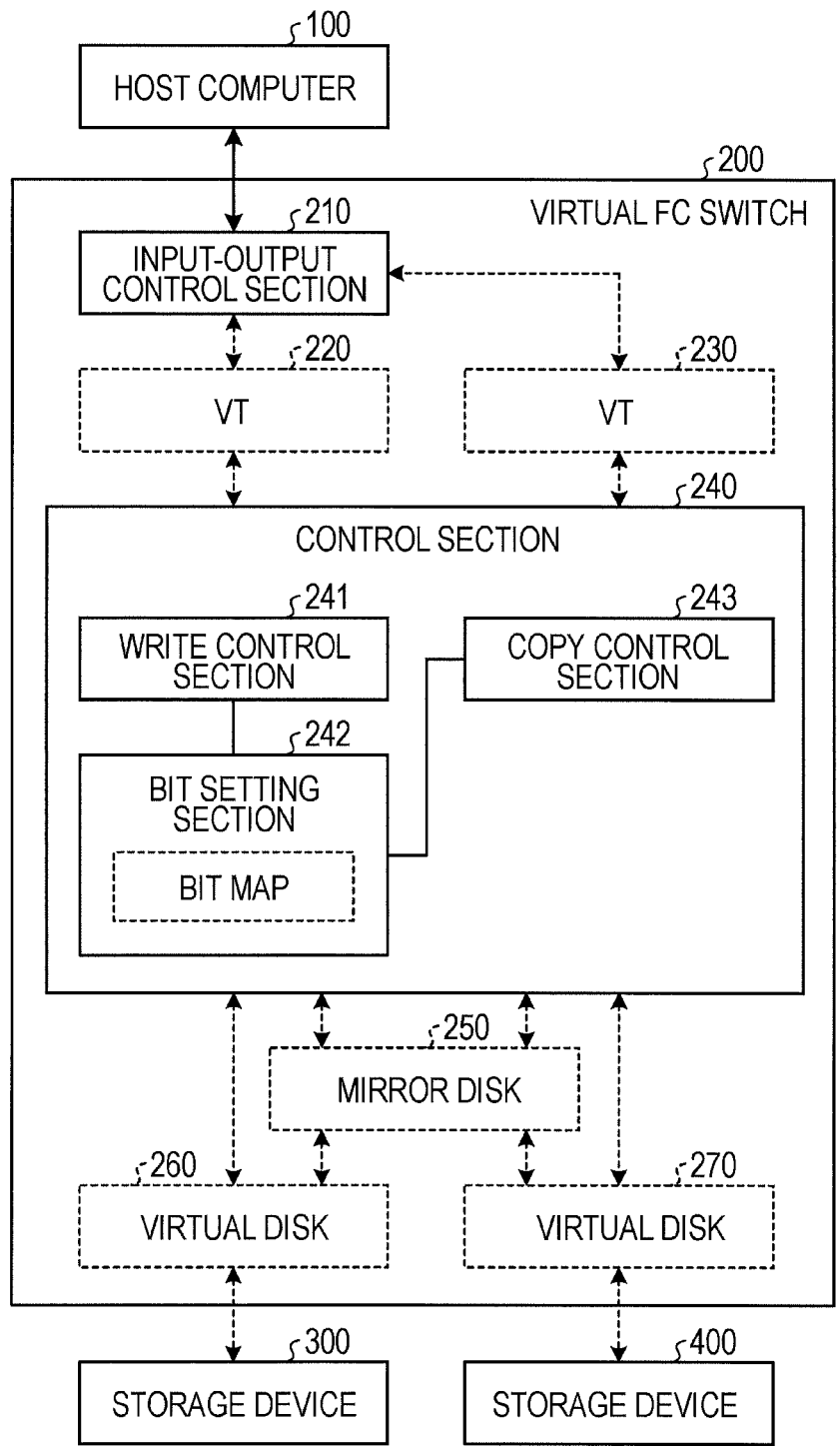
FIG. 2 is a diagram illustrating a configuration of a virtual FC switch according to an embodiment 2.

FIG. 2 is a diagram illustrating a configuration of the virtual FC switch according to the embodiment 2. In addition, in FIG. 2, only processing function sections necessary for explaining the virtual FC switch according to the embodiment 1 are illustrated.

As shown in FIG. 2, the virtual FC switch 200 according to the embodiment 1 is connected in a state in which the virtual FC switch 200 can send and receive data to and from a host computer 100 and storage devices 300 and 400 which are physical storage resources. The virtual FC switch 200 includes an input-output control section 210, VTs 220 and 230, a control section 240, a mirror disk 250, and virtual disks 260 and 270.

The input-output control section 210 controls input and output of various types of information sent and received to and from the host computer 100 or the like. For example, the input-output control section 210 controls input of write I/O or read I/O or the like, sent from the host computer 100.

The virtual targets (VT) 220 and 230 cause the virtual disks 260 and 270 corresponding to the virtual targets (VT) 220 and 230 respectively to be identified by the host 100. Namely, the host 100 realizes access to the virtual disks 260 and 270 by transmitting an access request to a virtual target (VT) set in the virtual FC switch 200.

The virtual disk 260 corresponds to the storage device 300 having higher data input-output performance than the storage device 400 and functions as a copying source. The virtual disk 270 corresponds to the storage device 400 and functions as a copying destination. In addition, the input-output performance is the response performance of a storage device, which corresponds to the time taken to enter a standby state in the condition in which the storage device can deal with I/O from the host. For example, in the case shown in FIG. 9, the time from transmission of a write command from the host to the storage device and reception of a response from the storage device corresponds to the data input-output performance.

The control section 240 controls processing operations for write I/O and read I/O and a data copy operation performed between the virtual disks 260 and the virtual disk 270. Then, as shown in FIG. 2, the control section 240 includes a write control section 241, a bit setting section 242, and a copy control section 243.

When the write command is transferred from the host 100 during a copy session used for copying data from the virtual disk 260 to the virtual disk 270, the write control section 241 only executes a write command on a virtual disk having higher input-output performance.

Specifically, when the write command is transferred from the host 100 during the copy session, the write control section 241 only writes data into the virtual disk 260 which corresponds to the storage 300 having higher input-output performance. In addition, the write control section 241 performs a write operation in synchronization with a copy operation during the copy session performed by the copy control section 243 described hereinafter. A specific operation, performed by the write control section 241, or the like will be described hereinafter with reference to FIGS. 3 and 4.

The bit setting section 242 stores a write location of the virtual disk 260 on which the write control section 241 executes the write command during the copy session. Specifically, the bit setting section 242 stores the write location by setting a bit in a bit map to "ON", the bit corresponding to an area in the virtual disk 260 in which the write control section 241 stores data from the host 100. In addition, while the embodiment is not limited to the case in which the bit map is used, various types of information may be used as long as the copy control section 243 described hereinafter can identify the write location of the virtual disk 260 on which the write command from the host 100 is executed. A specific operation, performed by the bit setting section 242, or the like will be described hereinafter with reference to FIGS. 3 and 4.

The copy control section 243 controls a copy operation performed during a copy session used for copying data from the virtual disk 260 to the virtual disk 270, the data being written in the virtual disk 260 in response to the write I/O from the host. Specifically, from the initial logical block address (LBA) of the virtual disk 260 to the final LBA thereof, the copy control section 243 repeats an operation to write data into the virtual disk 270 which is a copying destination.

In addition, the copy control section 243 writes data stored in the virtual disk 260 into the virtual disk 270, after the write processing performed by the write control section 241 is terminated, the data being fixed by the write location stored in the bit map. Specifically, after the write processing on the virtual disk 260 is terminated, the copy control section 243 scans the bit map and thereby writes data, which is written in areas in the virtual disk 260, into the virtual disk 270, the areas corresponding to bits set to "ON" in the bit map. In addition, a specific operation, performed by the copy control section 243, or the like will be described hereinafter with reference to FIGS. 3 and 4.

Operation Performed by Virtual FC Switch
(Embodiment 2)

Figure 3:
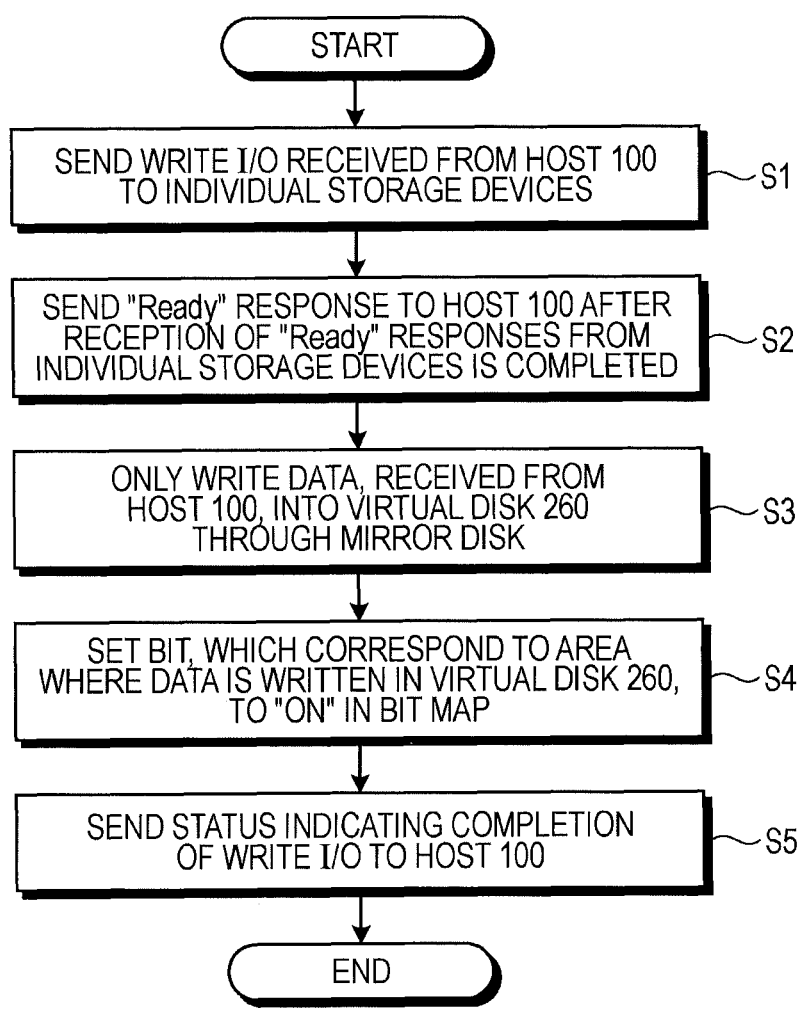
FIG. 3 is a diagram for illustrating an operation performed by the virtual FC switch according to the embodiment 2.
Figure 4:
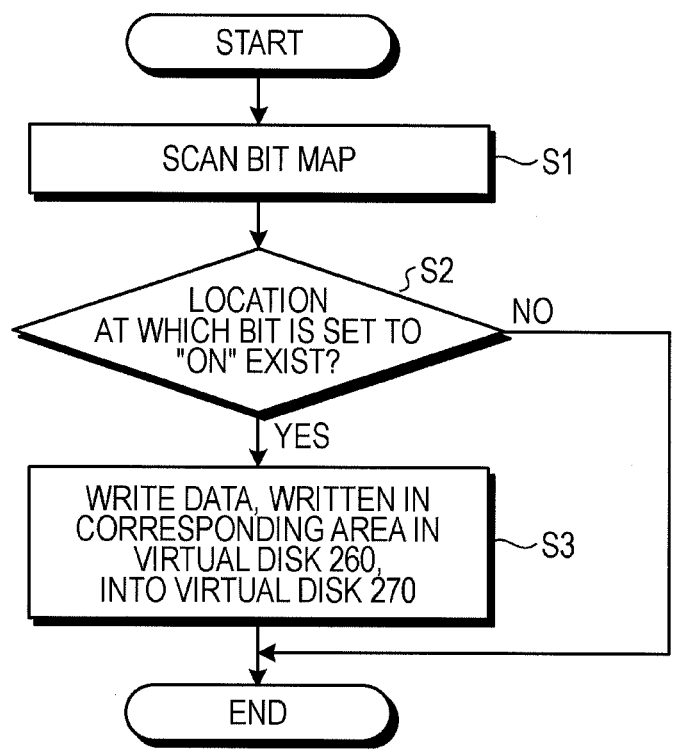
FIG. 4 is a diagram for illustrating an operation performed by the virtual FC switch according to the embodiment 2.

FIGS. 3 and 4 are diagrams for illustrating an operation performed by the virtual FC switch according to the embodiment 2. An operation, performed when write I/O is received from the host 100 during a copy operation for copying data written in the virtual disk 260 to the virtual disk 270, will be described hereinafter. In addition, it is assumed that an operation performed by the virtual FC switch 200, described hereinafter, is performed in no association with and in synchronization with the copy operation.

As shown in FIG. 3, the write control section 241 in the virtual FC switch 200 sends write I/O received from the host 100 to individual storage devices (storage devices 300 and 400) (Step S1). Then, the write control section 241 sends a "Ready" response to the host 100 after reception of "Ready" responses from individual storage devices is completed (Step S2).

When the write control section 241 receives data from the host 100, the write control section 241 generates a mirror disk from the virtual disk 260 and the virtual disk 270 and only writes the data, received from the host 100, into the virtual disk 260 through the mirror disk (Step S3).

When the write control section 241 completes an operation for writing the data in the virtual disk 260, the bit setting section 242 in the virtual FC switch sets bits in the bit map to "ON", the bits corresponding to areas in which the data is written in the virtual disk 260 (Step S4).

When the bit setting section 242 completes the bit setting operation for the bit map, the bit setting section 242 sends a status indicating completion of write I/O to the host 100 (Step S5) and the virtual FC switch 200 completes the operation.

Next, with reference to FIG. 4, an asynchronous write operation for writing the data, written in the virtual disk 260, in the virtual disk 270 will be described, the asynchronous write operation performed, for example regularly, in the virtual FC switch 200.

As shown in FIG. 4, the copy control section 243 in the virtual FC switch 200 scans the bit map included in the bit setting section 242 (Step S1) and determines whether or not a location at which a bit is set to "ON" exists (Step S2).

When, as a result of the determination, the location at which the bit is set to "ON" exists in the bit map (Step S2 YES), data, written in an area in the virtual disk 260, is written in the virtual disk 270 (Step S3), the area corresponding to the bit setting section in which the bit is set to "ON". Then, the virtual FC switch 200 completes the operation.

On the other hand, when the location at which the bit is set to "ON" does not exist in the bit map (Step S2 NO), the virtual FC switch 200 completes the asynchronous write operation without change.

Advantage Due to Embodiment 2

Figure 5:
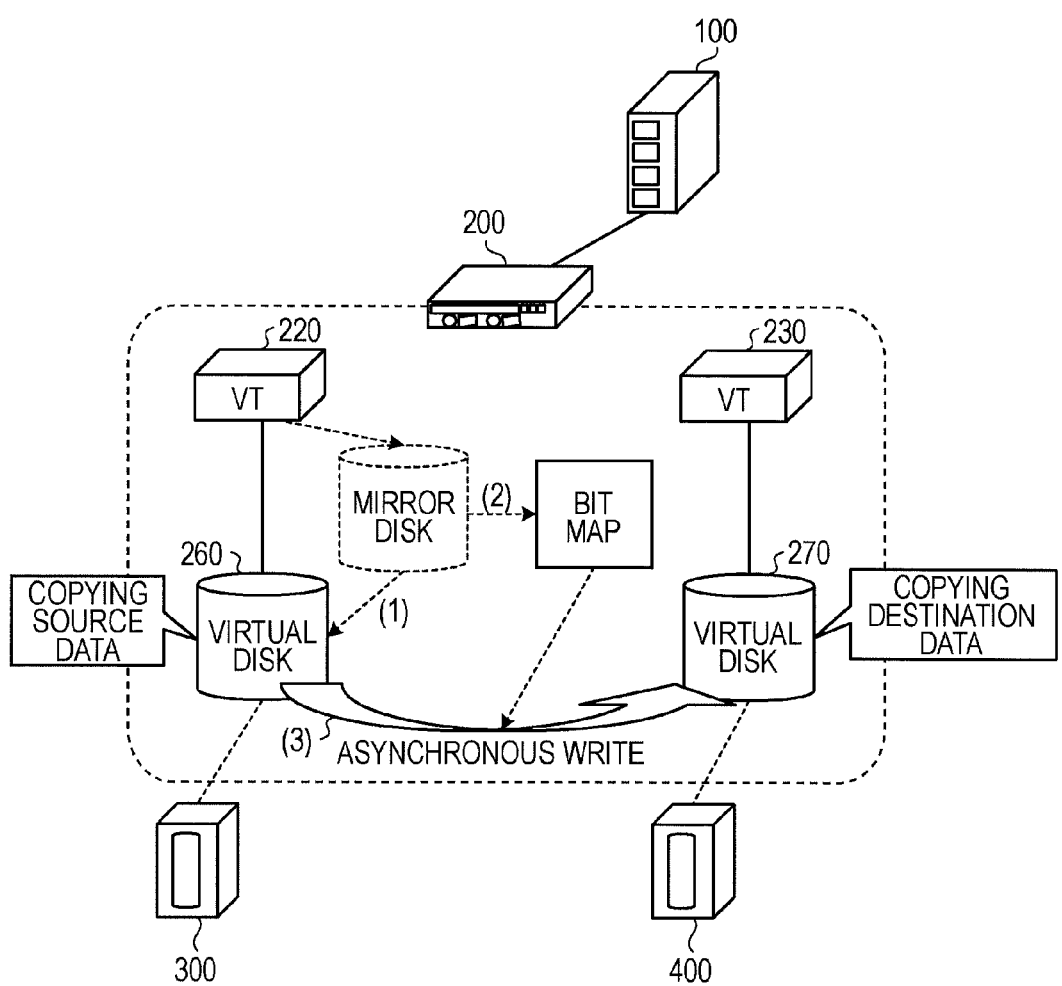
FIG. 5 is a diagram for illustrating the virtual FC switch according to the embodiment 2.

As mentioned above, according to the embodiment 2, when write I/O is received from the host 100 during a copy operation for copying data written in the virtual disk 260 to the virtual disk 270, the virtual FC switch 200 only writes data from the host 100 into the virtual disk 260 which is a copying source (refer to (1) in FIG. 5).

Next, the virtual FC switch 200 sets a bit in the bit map to "ON", the bit corresponding to an area in which the data is written in the virtual disk 260 (refer to (2) in FIG. 5). Subsequently, at another time which is different from a time when the data from the host 100 is written in the virtual disk 260, namely, asynchronously, the virtual FC switch 200 writes data written in the virtual disk 260 into the virtual disk 270. Accordingly, the virtual FC switch 200 makes the virtual disk 260 and the virtual disk 270 equivalent to each other (refer to (3) in FIG. 5). FIG. 5 is a diagram for illustrating the virtual FC switch according to the embodiment 2.

According to the embodiment 2, the virtual FC switch does not perform a synchronous write operation for writing data from the host 100 in both the virtual disk 260 and the virtual disk 270 in synchronization with write I/O from the host 100 in the same way as the related art. In addition, the virtual FC switch only writes data into the virtual disk 260 which corresponds to the storage device 300 having higher data input-output performance than the storage device 400.

Accordingly, it is necessary for the virtual FC switch to wait for a response from the virtual disk 270 which corresponds to the storage device 400 having lower data input-output performance than the storage device 300, the response indicating a state in which the virtual disk 270 can deal with I/O from the host (Ready response, for example, refer to FIG. 9). In addition, the virtual FC switch only writes data into the virtual disk 260, which is in a state where the virtual disk 260 can deal with I/O from the host, and responds to the host 100 with completion of writing. Namely, the performance of the storage device 300 is not restrained by the performance of the storage device 400, nor becomes the performance of the virtual FC switch 200 dealing with I/O from the host worse.

In this way, in the storage system including a plurality of storages which have individually different data input-output performance, the virtual FC switch 200 according to the embodiment 2 performs a data processing operation by using, at full value, the performance of the storage device having higher performance and prevents the processing performance for write I/O from the host from becoming worse.

Embodiment 3

In the above-mentioned embodiment 2, a synchronous write operation for writing data from the host 100 in both the virtual disk 260 and the virtual disk 270 in synchronization with write I/O from the host 100 and an asynchronous write operation for writing data, written in the virtual disk 260 in response to write I/O from the host 100, in the virtual disk 270 in asynchronous timing with the write I/O may be switched.

Configuration of Virtual FC Switch (Embodiment 3)

Figure 6:
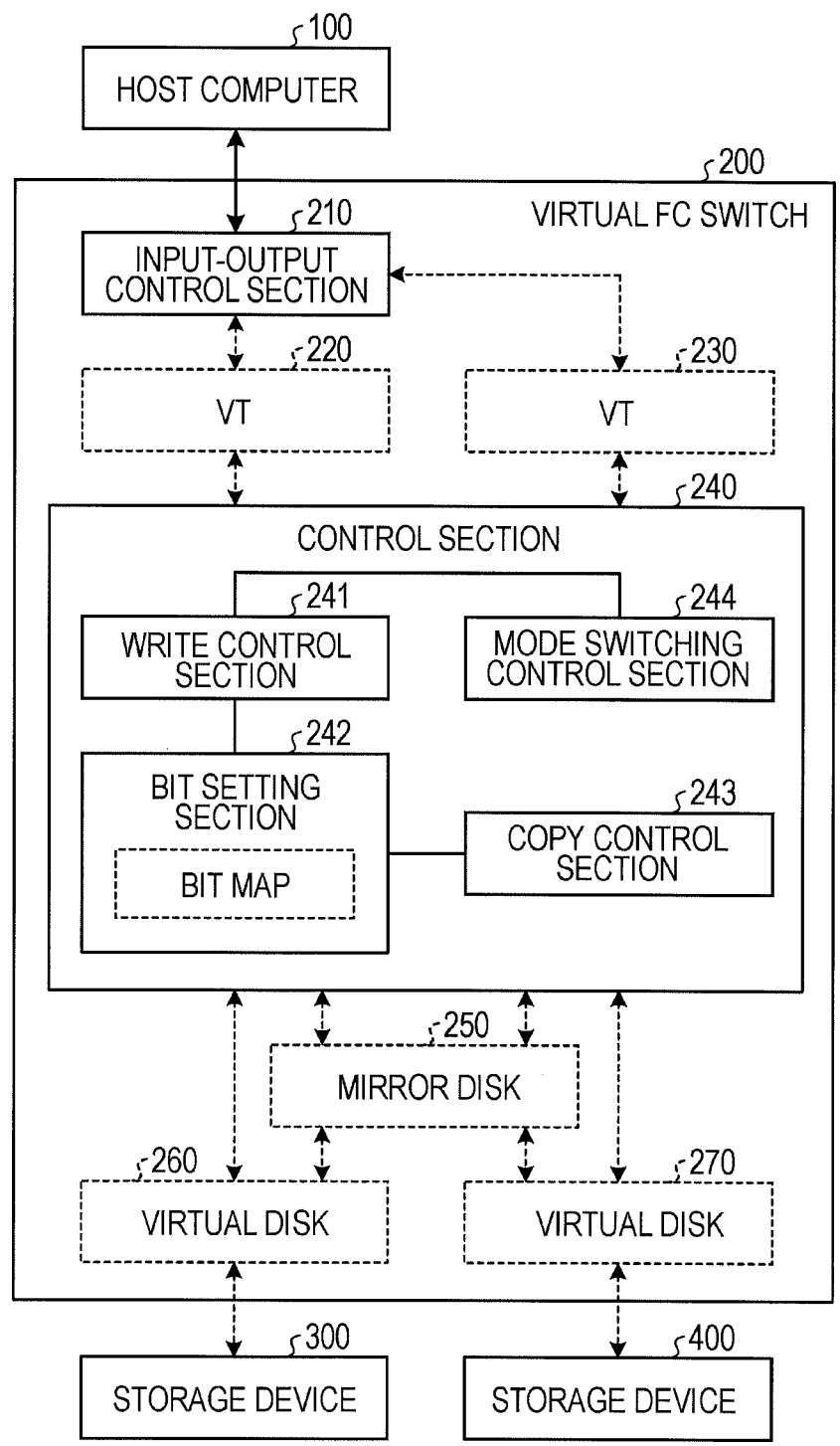
FIG. 6 is a diagram illustrating a configuration of a virtual FC switch according to an embodiment 3.

FIG. 6 is a diagram illustrating a configuration of a virtual FC switch according to an embodiment 3. The virtual FC switch 200 according to the embodiment 3 is different from the virtual FC switch 200 according to the embodiment 2 by the presence of a mode switching control section 244.

Specifically, when reception of "Ready" responses from individual storage devices is completed in the write control section 241, the mode switching control section 244 causes the write control section 241 to halt a write operation temporarily. Then, the mode switching control section 244 calculates a reception-time difference between "Ready" responses from the storage devices, compares the calculated reception-time difference with a predetermined threshold value, and determines an input-output performance difference between the storage devices on the basis of the comparison result.

When, as a result of the comparison of the reception-time difference between "Ready" responses from the individual storage devices with the predetermined threshold value, the reception-time difference exceeds the predetermined threshold value, the mode switching control section 244 switches, for example, from a synchronous write mode which is temporarily set in the write control section 241 at the present moment to an asynchronous write mode. Then, the mode switching control section 244 causes the write control section 241 to resume the write operation.

The write control section 241 resumes the write operation, sends a "Ready" response to the host 100, and only writes data, received from the host 100, into the virtual disk 260 according to the asynchronous write mode set by the mode switching control section 244. Subsequent operations are the same as the above-mentioned embodiment 2 (for example, refer to operations, performed after Step S2, in FIG. 3 and operations in FIG. 4).

In addition, When, as a result of the comparison of the reception-time difference between "Ready" responses from the individual storage devices with the predetermined threshold value, the reception-time difference is less than or equal to the predetermined threshold value, the mode switching control section 244 maintains, for example, the synchronous write mode which is temporarily set in the write control section 241 at the present moment. Then, the mode switching control section 244 causes the write control section 241 to resume the write operation.

The write control section 241 resumes the write operation, sends a "Ready" response to the host 100, and writes data, received from the host 100, into both the virtual disk 260 and the virtual disk 270 according to the synchronous write mode set by the mode switching control section 244. When the data write operation is completed, the write control section 241 sends a status indicating completion of write I/O to the host 100 in the same way as in the asynchronous write mode.

Operation Performed by Virtual FC Switch (Embodiment 3)

Figure 7:
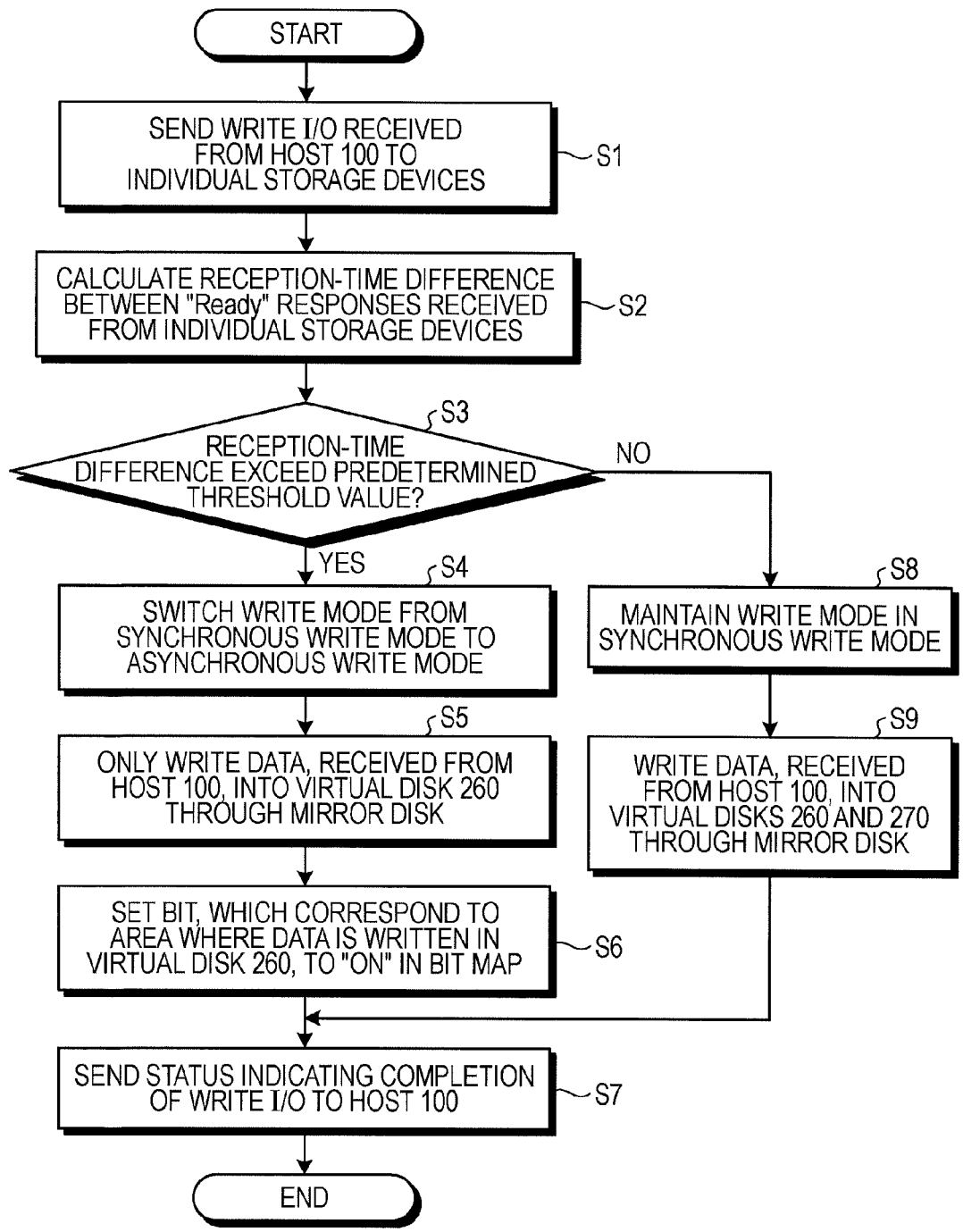
FIG. 7 is a diagram for illustrating an operation performed by the virtual FC switch according to the embodiment 3.

FIG. 7 is a diagram for illustrating an operation performed by the virtual FC switch according to the embodiment 3. The operation performed by the virtual FC switch according to the embodiment 3 is different from the operation performed by the virtual FC switch according to the embodiment 2 by the point described hereinafter. In addition, an operation performed when a data write mode in the write control section 241 is set to the synchronous write mode at the present moment will be described hereinafter.

Namely, the mode switching control section 244 calculates a reception-time difference between "Ready" responses from the individual storage devices, compares the calculated reception-time difference with the predetermined threshold value, and determines an input-output performance difference between the storage devices on the basis of the comparison result (Step S3).

When, as a result of the comparison of the reception-time difference between "Ready" responses from the individual storage devices with the predetermined threshold value, the reception-time difference exceeds the predetermined threshold value (Step S3 affirmative), the mode switching control section 244 switches, for example, from a synchronous write mode which is temporarily set in the write control section 241 at the present moment to an asynchronous write mode (Step S4). Then, the mode switching control section 244 causes the write control section 241 to resume the write operation.

The write control section 241 sends a "Ready" response to the host 100, and only writes data, received from the host 100, into the virtual disk 260 according to the asynchronous write mode set by the mode switching control section 244 (Step S5). Subsequent operations are the same as the above-mentioned embodiment 2 (for example, refer to operations performed after Step S2 in FIG. 4). Then, the write control section 241 sends a status indicating completion of write I/O to the host 100 (Step S7) and completes the data write operation.

Here, returning to the description of Step S3, when, as a result of the comparison of the reception-time difference between "Ready" responses from the individual storage devices with the predetermined threshold value, the reception-time difference is less than or equal to the predetermined threshold value (Step S3 negative), the mode switching control section 244 maintains the synchronous write mode which is set in the write control section 241 (Step S8). Then, the mode switching control section 244 causes the write control section 241 to resume the write operation.

The write control section 241 sends a "Ready" response to the host 100 and writes data, received from the host 100, into both the virtual disk 260 and the virtual disk 270 according to the synchronous write mode set by the mode switching control section 244 (Step S9). Then, the write control section 241 sends a status indicating completion of write I/O to the host 100 (Step S7) and completes the data write operation.

In the operation of the virtual FC switch, when an operation for entirely copying data from the virtual disk 260 to the virtual disk 270 is completed, the two virtual disks are separated from each other, so that the two virtual disks work independently from each other.

In the case in which the write control section 241 is set in the asynchronous write mode, even when the operation for entirely copying data from the virtual disk 260 to the virtual disk 270 is completed, it takes a time to reflect write I/O from the host in the virtual disk 270 which is a copying destination. Accordingly, the separation operation is waited. Therefore, the case in which data from the host 100 is written in the two virtual disks synchronously while the write control section 241 is set in the synchronous write mode is more convenient.

In the embodiment 3 described above, the mode switching control section 244 calculates a reception-time difference between "Ready" responses from the individual storage devices, compares the calculated reception-time difference with the predetermined threshold value, and determines an input-output performance difference between the storage devices on the basis of the comparison result. Then, when there is not so much of an input-output performance difference between the storage devices, the write control section 241 is set in the synchronous write mode and data from the host 100 is written in the two virtual disks synchronously.

On the other hand, when there is an input-output performance difference between the storage devices, the write mode in the write control section 241 is switched to the asynchronous write mode and an write operation is performed so that the performance of a storage device which has higher performance is not restrained by the performance of a storage device 400 which has lower performance.

In this way, the virtual FC switch 200 according to the embodiment 3 performs a data processing operation by using, at full value, the performance of the storage device having higher performance. Accordingly, the virtual FC switch 200 not only prevents the processing performance corresponding to write I/O from the host from becoming worse but also realizes switching to a write mode which is more suitable in the operation of the virtual FC switch.

In addition, the determination operation for an input-output performance difference between the storage devices, performed on the basis of the calculated reception-time difference between "Ready" responses from the individual storage devices, may be performed regularly or in response to reception of write I/O from the host 100.

Embodiment 4

(1) Operation Performed when Storage Device Corresponding to Copying Source Virtual Disk has Lower Performance When the virtual FC switch 200 receives write I/O from the host 100, the virtual FC switch 200 updates data in the virtual disk 260 which functions as a copying source during a data copy operation performed between the virtual disks. Furthermore, when the virtual FC switch 200 receives read I/O from the host 100, the virtual FC switch 200 reads out data from the virtual disk 260 which functions as a copying source. Namely, the response performance of the virtual FC switch 200 for I/O from the host 100 depends on the input-output performance of the storage device corresponding to the virtual disk which functions as a copying source.

Accordingly, when the storage device 300 corresponding to the virtual disk 260 which functions as a copying source has lower input-output performance than the storage device 400 corresponding to the virtual disk 270 which functions as a copying destination, the performance for responding to the host 100 becomes degraded.

In the case in which the storage device 300 corresponding to the virtual disk 260 which is a copying source has lower input-output performance than the storage device 400 corresponding to the virtual disk 270 which is a copying destination, if data is written only in the virtual disk 260, which has functioned as a copying source, when write I/O is received from the host 100 during a data copy operation performed between the virtual disks, as a result, the performance for responding to the host becomes more degraded. Therefore, in this case, a synchronous write operation is performed.

After the data copy operation performed between the virtual disks is completed and data stored in the virtual disk 260 and data stored in the virtual disk 270 become equivalent to each other (after a copy operation between the virtual disks, performed by the copy control section 243, is completed), the write control section 241 only writes data, which corresponds to write I/O from the host 100, into the virtual disk 270 which is a copying destination.

In addition, for example, by receiving completion notice of the copy operation from the copy control section 243, the write control section 241 recognizes a time when data stored in the virtual disk 260 and data stored in the virtual disk 270 become equivalent to each other.

When an operation for writing data in the virtual disk 270, performed by the write control section 241, is completed, namely, a data write operation after the time when data stored in the virtual disk 260 and data stored in the virtual disk 270 become equivalent to each other is completed, the bit setting section 242 sets bits in the bit map to "ON", the bits corresponding to areas in which the data is written in the virtual disk 270.

Then, the copy control section 243 scans the bit map included in the bit setting section 242 and, by writing data, stored in the area in the virtual disk 270, in the virtual disk 260 on the basis of a location at which a bit is set to "ON" on the bit map, makes the virtual disk 270 and the virtual disk 260 equivalent to each other.

In this way, while equivalence between the virtual disks is maintained, the performance for responding to the host can be improved as far as possible.

In addition, when a data write destination is selected between the virtual disks in response to write I/O from the host 100, taking into account degradation of the input-output performance, which is due to temporal load growth in the storage, the data write destination may be selected on the basis of the reception-time difference between "Ready" responses from the individual storage devices, as described in the above-mentioned embodiment 3.

(2) Operation According to Update Count of Virtual Disk

According to the practical example described in the embodiment mentioned above, while a data processing operation which uses, at full value, the performance of the storage device having higher performance is realized, the response performance for write I/O from the host 100 can be improved.

However, in the case in which write I/O is frequently sent from the host 100 and update of the virtual disk is performed whenever the write I/O is received, a processing load, due to a data copy operation performed between the virtual disks, increases in the virtual FC switch 200. In addition, when the virtual FC switch and the storage device are connected through a multiprotocol router, transmission and reception of data between the host 100 and the virtual FC switch 200 increases, the data being transmitted and received in accordance with a data copy operation performed between the virtual disks. Accordingly, the transmission and reception of data becomes a load on communication traffic.

Therefore, the update count of each bit is also stored in the bit map included in the bit setting section 242. Then, when the bit map is operated, the bit having a high frequency of update is prevented from being scanned each time. Accordingly, a processing load, due to a data copy operation performed between the virtual disks, can decrease in the virtual FC switch 200.

(3) Device Configuration Etc.

Individual constructional elements included in the virtual FC switch 200 shown in FIG. 2 or FIG. 6 are illustrated as functional concepts. Therefore, it is not necessary for the constructional elements to be physically configured to be as illustrated. Namely, the specific configuration of the virtual FC switch 200 which is integrated or distributed is not limited to the illustrated examples. Then, for example, the bit setting section 242 and the copy control section 243, shown in FIG. 2, may be functionally or physically integrated. Alternatively, the write control section 241 and the mode switching control section 244, shown in FIG. 6, may be functionally or physically integrated.

In this way, all or part of the virtual FC switch 200 may be functionally or physically integrated or distributed in arbitrary units according to various loads and various statuses of use. Furthermore, the individual processing functions performed in the virtual FC switch 200 (refer to FIGS. 2 and 4) may be in whole or in arbitrary part realized, for example, by a central processing unit (CPU) and a program analyzed and executed in the CPU, or as a hardware which uses hard-wired logic.

As mentioned above, the present invention has been specifically described for better understanding of the embodiments thereof and the above description does not limit other aspects of the invention. Therefore, the present invention can be altered and modified in a variety of ways without departing from the gist and scope thereof.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An apparatus for controlling a first storage for storing data and a second storage for storing data, comprising:
   a controller for receiving a write command sent out from a host;
   a determining unit for sending out a request corresponding to the write command to the first storage and the second storage upon receiving the write command from the host, for receiving a first response corresponding to the request from the first storage and a second response corresponding to the request from the second storage, and for determining one of the storages on the basis of a first and second response times, the first response time and the second response time being time until receiving the response from the first and second storage after sending out the request to the first and second storage;
   a first writing unit for writing data into the determined storage; and
   a second writing unit for writing the data written in the determined storage into the other storage after writing the data into the determined storage by the first writing unit.

2. The apparatus of claim 1, further comprising a memory unit for storing area information indicating an area of the determined storage where the data is written by the first writing unit.

3. The apparatus of claim 2, wherein the second writing unit writes the data into the other storage on the basis of the area information.

4. The apparatus of claim 1, further comprising a storage for storing a frequency of update of the area.

5. The apparatus of claim 4, wherein the second writing unit determines whether or not writing the data written in the determined storage into the other storage on the basis of the frequency of update of the area.

6. The apparatus of claim 1, wherein the first writing unit writes data into the first storage unit and the second storage unit when an input/output performance of the second storage unit is higher than an input/output performance of the first storage unit and writes the data into the second storage upon completely processing a copy from the first storage unit to the second storage unit, and the second writing unit writes data stored in the second storage into the first storage unit after writing the data into the first storage by the first writing unit.

7. A computer-readable recording medium that stores a computer program for controlling an apparatus for controlling a first storage for storing data and a second storage for storing data, according to a process comprising:
receiving a write command sent out from a host by a controller;
sending out the write command to the first storage and the second storage by the controller;
sending out a request corresponding to the write command to the first storage and the second storage; by a determining unit;
receiving a first response corresponding to the request from the first storage and a second response corresponding to the request from the second storage by the determining unit;
determining one of the storages on the basis of a first and second response times, the first and the second response times being time until receiving the response from the first and second storage after sending out the request to the first and second storage by the determining unit;
writing data into the determined storage by a first writing unit; and
writing the data written in the determined storage into the other storage after writing the data into the determined storage by the first writing unit by a second writing unit.

8. The computer-readable recording medium of claim 7, wherein the second writing unit writes the data into the other storage on the basis of area information indicating an area of the determined storage where the data is written by the first writing unit.

9. The computer-readable recording medium of claim 8, wherein the second writing unit determines whether or not writing the data written in the determined storage into the other storage on the basis of a frequency of update of the area.

10. The computer-readable recording medium of claim 7, wherein the first writing unit writes data into the first storage unit and the second storage unit when an input/output performance of the second storage unit is higher than an input/output performance of the first storage unit and writes the data into the second storage upon completely processing a copy from the first storage unit to the second storage unit, and the second writing unit writes data stored in the second storage into the first storage unit after writing the data into the first storage by the first writing unit.

11. A storage system comprising:
a host for issuing a write command;
a first storage for storing data;
a second storage for storing data; and
a controller for receiving the write command sent out from the host and for sending out the write command the first storage and the second storage;
wherein the controller includes:
a determining unit for sending out a request corresponding to the write command to the first storage and the second storage, for receiving a first response corresponding to the request from the first storage and a second response corresponding to the request from the second storage, and for determining one of the storages on the basis of a first and second response times, the first and the second response times being time until receiving the response from the first and second storage after sending out the request to the first and second storage;
a first writing unit for writing data into the determined storage; and
a second writing unit for writing the data written in the determined storage into the other storage after writing the data into the determined storage by the first writing unit.

12. The storage system of claim 11, further comprising a memory unit for storing area information indicating an area of the determined storage where the data is written by the first writing unit.

13. The storage system of claim 12, wherein the second writing unit writes the data into the other storage on the basis of the area information.

14. The storage system of claim 11, further comprising a storage for storing a frequency of update of the area.

15. The storage system of claim 14, wherein the second writing unit determines whether or not writing the data written in the determined storage into the other storage on the basis of the frequency of update of the area.

16. The storage system of claim 11, wherein the first writing unit writes data into the first storage unit and the second storage unit when an input/output performance of the second storage unit is higher than an input/output performance of the first storage unit and writes the data into the second storage upon completely processing a copy from the first storage unit to the second storage unit, and the second writing unit writes data stored in the second storage into the first storage unit after writing the data into the first storage by the first writing unit.

* * * * *